United States Patent [19]

Waggoner

[11] Patent Number: 4,535,860

[45] Date of Patent: Aug. 20, 1985

[54] TANDEM DRIVE MOUNTING

[75] Inventor: Van E. Waggoner, Dubuque, Iowa

[73] Assignee: Deere & Company, Moline, Ill.

[21] Appl. No.: 412,734

[22] Filed: Aug. 30, 1982

[51] Int. Cl.³ .............................................. B62D 61/10
[52] U.S. Cl. .................................... 180/24.05; 180/21
[58] Field of Search ............... 180/24.05, 24.04, 24.09, 180/22, 23, 24; 403/292, 293

[56] References Cited

U.S. PATENT DOCUMENTS

| | | | |
|---|---|---|---|
| 2,554,785 | 5/1951 | Leliter | 180/24.05 |
| 2,824,615 | 2/1958 | Lado | 180/24.05 |
| 3,454,109 | 7/1969 | Roberts | 180/24.05 |
| 3,727,711 | 4/1973 | Sebern | 180/24.05 |

OTHER PUBLICATIONS

John Deere Advertising Brochure, JD570-A Motor Grader, A-1790-C-71-6, cover and back pages, and pp. 12 and 13.

*Primary Examiner*—Joseph F. Peters, Jr.
*Assistant Examiner*—Donn McGiehan

[57] ABSTRACT

A tandem drive includes a tandem housing having final drive and axle housings releasably mounted thereto and accurately located one to the other by locating dowels. The final drive and axle housings each have a mounting flange engaged against the tandem housing and having an O-ring groove located therein and receiving an O-ring.

3 Claims, 4 Drawing Figures

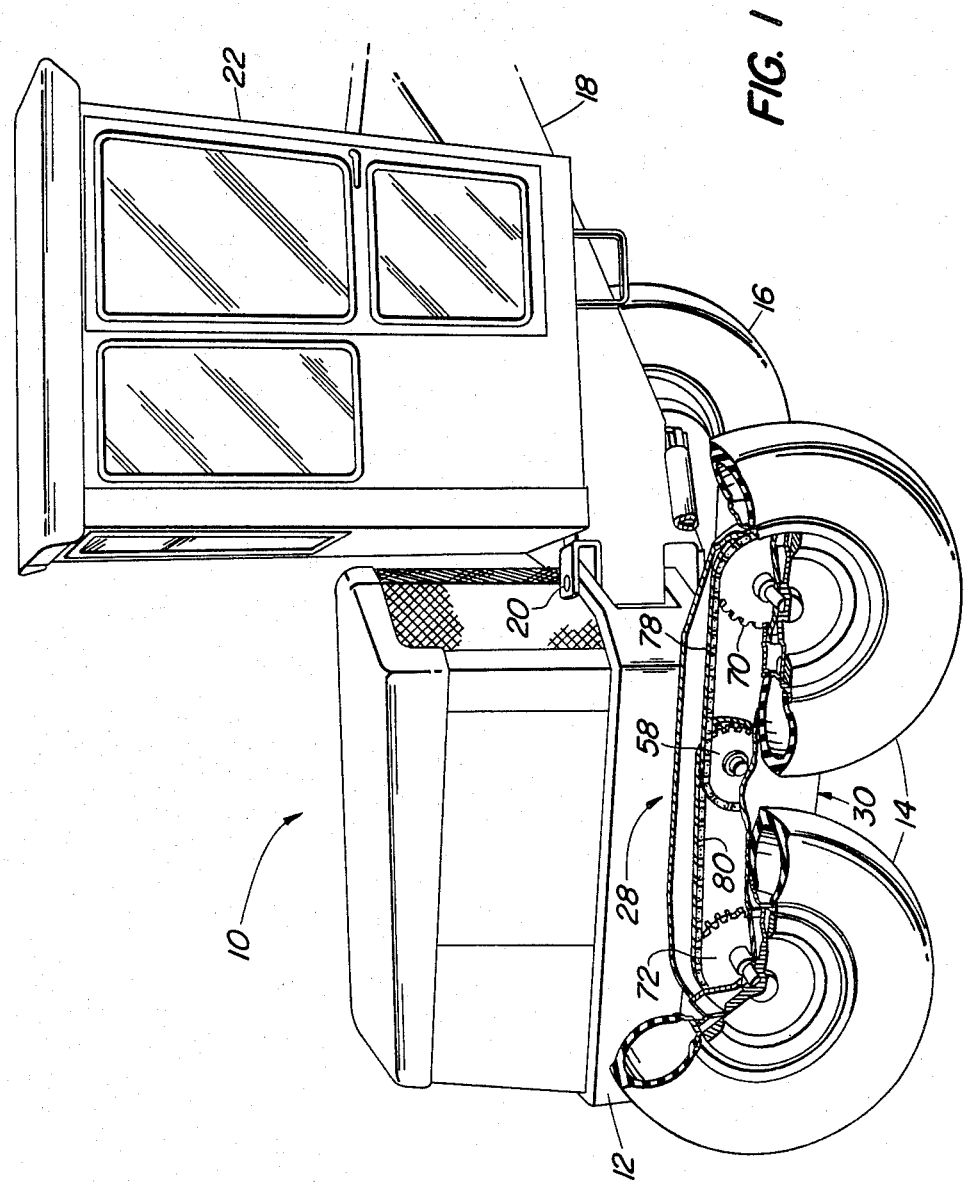

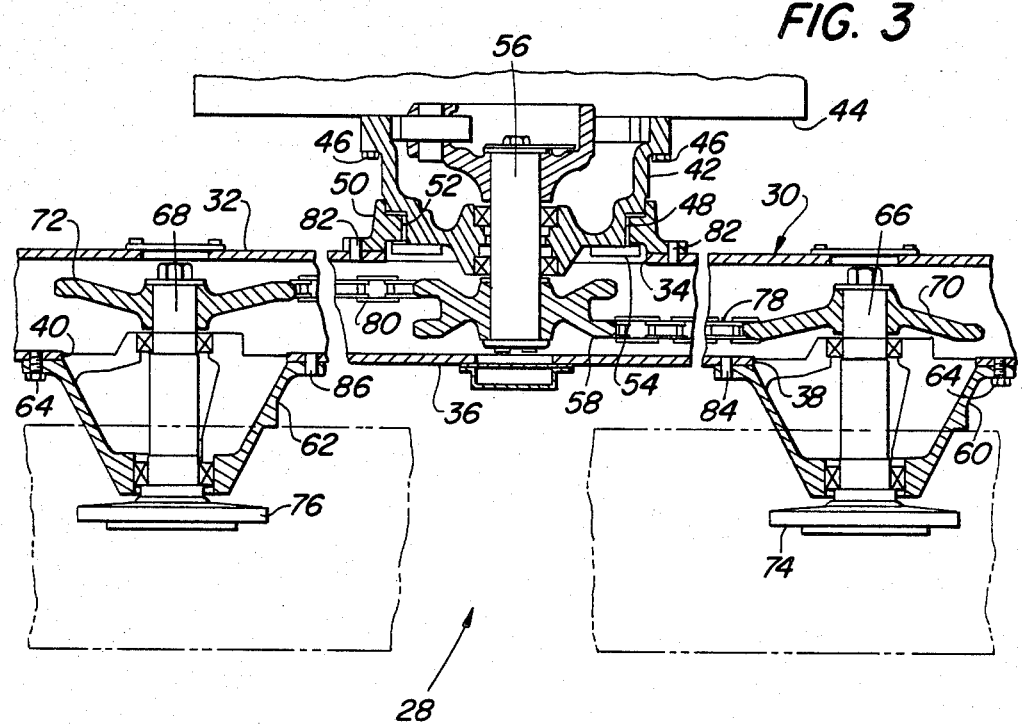
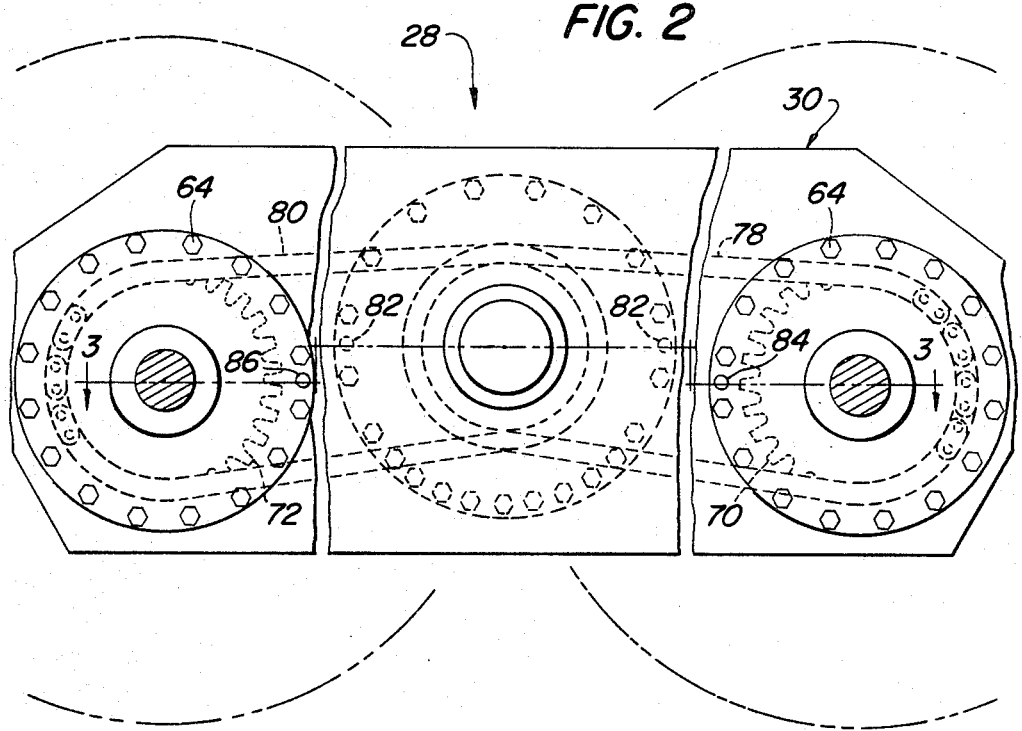

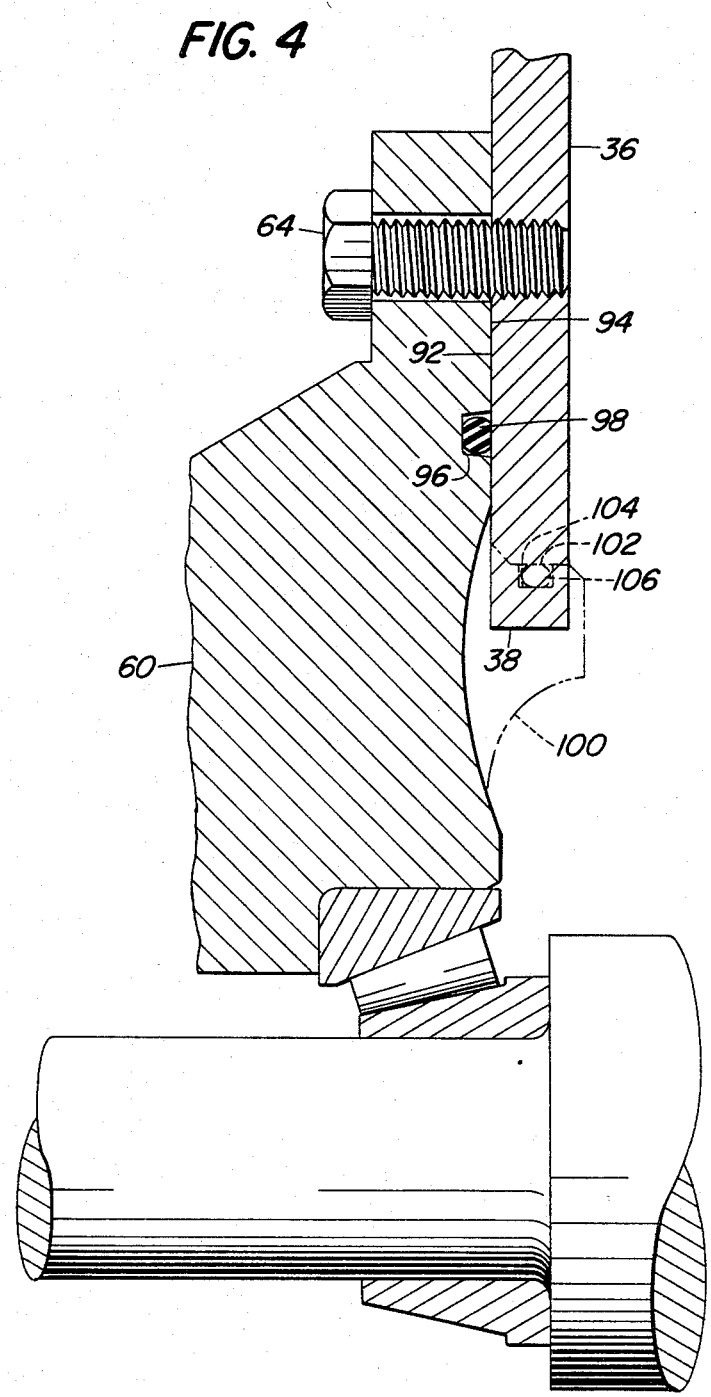

TANDEM DRIVE MOUNTING

BACKGROUND OF THE INVENTION

The present invention relates to tandem drives and more specifically relates to driver and driven shaft mountings for such drives.

Some vehicles, of which motor graders are an example, have tandem drive wheels which are driven by means of a tandem drive including a tandem housing having a driver shaft mounted centrally therein and carrying a double sprocket which is drivingly connected by respective chains to sprockets carried by a pair of driven shafts which are mounted on opposite sides of the driver shaft. Lubrication for the tandem drive is provided by oil located within the tandem box.

Conventionally, proper spacing between the driver and driven shafts is maintained by providing precisely spaced, machined pilot openings in the tandem housing, with extensions of respective housings supporting the driver and driven shafts being received in the pilot openings. Also, it is conventional to seal these pilot openings for preventing the loss of lubricant by providing each of the shaft housing extensions with an O-ring groove which receives an O-ring that seals against a respective one of the machined openings.

The machining of the relatively large pilot holes is quite time consuming, and of course a certain amount of material is necessary to form extensions on the shaft housings. Also, the seal surface between the extensions and the tandem housing wall is quite narrow, and therefore sealing is not as problem-free as it might be if the surface were wider.

SUMMARY OF THE INVENTION

According to the present invention there is provided an improved driver and driven shaft mounting for a vehicle tandem drive.

A broad object of the invention is to provide a tandem drive shaft mounting which provides sealing of the tandem housing and precise spacing between the driver and driven shafts while significantly reducing the amount of machining and material that conventional tandem drives require.

More specifically it is an object of the invention to seal the interface between each of the housings of the driver and driven shafts and the tandem housing by providing an O-ring in a face of the shaft housing which engages a surface of the tandem housing which extends annularly about a shaft-receiving opening provided in the tandem housing.

Yet it is another specific object of the invention to ensure proper spacing between the driver and driven shafts of a tandem drive by providing shaft-housing locating dowels fixed to the tandem housing.

These and other objects of the invention will be apparent from a reading of the ensuing description together with the appended drawings.

BRIEF DESCRIPTION OF THE DRAWING

FIG. 1 is a perspective view of a rear portion of a motor grader embodying a tandem drive constructed in accordance with the principles of the present invention.

FIG. 2 is a side view of a tandem drive assembly.

FIG. 3 is a sectional view taken along line 3—3 of FIG. 2.

FIG. 4 is a sectional view showing the mode of sealing the tandem housing about the opening which receives one of the driven shafts.

DESCRIPTION OF THE PREFERRED EMBODIMENT

Referring now to FIG. 1, therein is shown the rear portion of a motor grader 10 including a rear frame section 12 supported on right- and left-hand sets of driven tandem wheels 14 and 16, respectively. A front frame section 18 has its rear end connected to the rear frame section by a vertical hinge joint assembly 20, and mounted on the frame section 18 so as to extend over the joint assembly is an operator's cab 22.

An engine (not shown) is carried by the rear frame section and is coupled to a power train for driving the tandem wheel sets 14 and 16 through respective tandem drives of which only the right-hand tandem drive 28 is shown and described.

Referring now to FIGS. 2 and 3, it can be seen that the tandem drive 28 includes a tandem housing or box 30 having an inner wall 32 provided with a circular opening 34 located centrally therein midway between the opposite ends thereof. Provided in an outer wall 36 of the housing 30 are circular openings 38 and 40 which are respectively located equidistant forwardly and rearwardly from the opening 34.

A final drive housing 42 is releasably secured to a differential housing 44 by a series of cap screws 46. The housing 42 is provided with an annular bearing surface 48, and fixed annularly about the opening 34 in the tandem housing is an annular member 50 defining a ring 52 mounted for rotation about the surface 48 and held in place by a plurality of releasable retaining members 54. In this way, the tandem housing is mounted for functioning as a walking beam. The final drive housing supports a drive shaft 56 which extends into the tandem housing 30 and has a double sprocket 58 fixed thereon. Identical axle housings 60 and 62 are respectively fixed to the outer wall 36 of the tandem housing about the openings 38 and 40 by cap screws 64. The housings 60 and 62 respectively support axles 66 and 68. Respectively mounted on the inner ends of the axles 66 and 68 are sprockets 70 and 72, and provided at the outer ends of the axles for accommodating the mounting of the tandem wheel set 14 are flanges 74 and 76. First and second chains 78 and 80 are respectively trained about the sprocket 70 and the one sprocket of the double sprocket 58 and about the sprocket 72 and the other sprocket of the double sprocket 58.

In order to ensure proper spacing between the drive shaft 56 and the axles 66 and 68 so that proper tension exists in the chains 78 and 80 once the tandem drive 28 is assembled, a pair of precisely spaced dowels 82 are provided in the inner wall 32 of the tandem housing 30 at opposite sides of the opening 34 and are received in pilot holes provided in the annular member 50; and further dowels 84 and 86 are respectively provided in the outer wall 36 of the tandem housing respectively adjacent the circular openings 38 and 40 and are received in pilot holes respectively provided in the axle housings 60 and 62.

The connections of the ring 52 and the axle housings 60 and 62 to the tandem housing 30 are each similarly sealed for preventing lubricating fluid from leaking from the tandem housing 30. The method of sealing used can be seen with reference to FIG. 4 wherein a vertical section through the axle housing 60 appears.

Specifically, it can be seen that the outer tandem housing wall 36 and the axle housing 60 are provided with annular opposite facing mounting surfaces 92 and 94, respectively, located between the series of cap screws 64 and the opening 38. An annular groove 96 is provided in the axle housing surface 94, and located in the groove 96 is an O-ring seal 98.

The advantage of the sealing method just described can best be appreciated by inspecting the dashed outline appearing in FIG. 4 in the vicinity of the opening 38. The dashed outline illustrates the traditional way of sealing the tandem housing. Specifically, the dashed outline shows an extension 100 of the axle housing having a circular surface 102 machined to fit the opening 38. The surface 102 contains an annular groove 104, and an O-ring seal 106 is received therein.

It will be appreciated then that, traditionally, correct spacing of the drive shaft and axles of a tandem drive is maintained by precise placement of respective openings for receiving housings for the drive and axle housings and to provide the drive and axle housings with machined extensions for fitting tightly within the openings. Further, it will be appreciated that sealing is traditionally accomplished by placing an O-ring seal in a groove contained in the extension. The time and expense involved in the placement of the openings in the tandem housing and the machining of the shaft and axle housing extensions of the traditional tandem drive design is avoided by the use of the placement dowels in the present design. Also, the respective seal surfaces between the openings and extensions are quite short in the traditional design since they were limited by the thickness of the tandem housing walls whereas a relatively wide, and thus more reliable sealing surface is provided by the mounting surfaces established between the tandem housing walls and the drive shaft and axle housings of the present design.

I claim:

1. In a tandem drive including a tandem housing having inner and outer vertical walls, a first circular opening provided in the inner wall centrally between opposite ends of the tandem housing, second and third circular openings provided in the outer wall at respective locations on opposite sides of and equidistant from the first opening, a final drive housing secured to the inner wall and supporting a drive shaft centrally within the first opening, and first and second axle housings respectively fixed to the outer wall and supporting first and second axles centrally within the second and third openings, the improvement comprising: at least one dowel pin provided in the inner wall and received in a locating hole in the final drive housing and at least two dowel pins provided in the outer wall with one each respectively received in a locating hole of each of the first and second axle housings; said one and two dowels being precisely located one to the other whereby the drive and first and second axle shafts are located precisely one to the other; said final drive and first and second axle housings respectively including annular surfaces engaged with a mating surface of the tandem housing located annularly about the first, second and third openings; and each annular surface being provided with an annular groove having a seal located therein.

2. In a tandem drive including a tandem housing having a pair of laterally spaced vertical walls, a first circular opening provided in one, and second and third circular openings being provided in another of said pair of walls with the first opening being spaced equidistant from the second and third circular openings, a final drive housing releasably secured to said one wall and supportng a final drive shaft centrally within the first circular opening, and first and second axle housings being releasably connected to said another wall and respectively supporting first and second axles centrally within the second and third circular openings, a double drive sprocket located within the tandem housing and fixed on the final drive shaft and first and second driven sprockets located within the tandem housing and respectively fixed on the first and second axles, and first and second chains respectively received about the double and first driven and the double and second driven sprockets, the improvement comprising: said final drive and first and second axle housings each having at least one locating hole located therein, a locating dowel received in each locating hole and fixed to said tandem housing at locations spaced precisely one from the other, whereby the final drive shaft and first and second axles are precisely located one from the other such that proper tension is established in said first and second chains; each of said final drive and first and second axle housings being provided with an annular mounting flange engaged with the tandem drive housing in surrounding relationship to a respective one of said first, second and third openings; and each annular mounting flange being provided with an annular groove having a seal mounted therein.

3. A tandem drive, comprising: a tandem housing having spaced, inner and outer vertical walls; said inner wall having a first opening provided therein and said outer wall having second and third openings located therein spaced equidistant from and being at opposite sides of the first opening; a final drive shaft rotatably mounted in a final drive housing; first and second drive axles respectively rotatably mounted in first and second axle housings; said final drive housing and said first and second axle housings each being provided with a mounting flange; each mounting flange being engaged with the tandem housing in surrounding relationship to a respective one of the first, second and third openings; each mounting flange being provided with a set of mounting holes and corresponding sets of threaded holes being provided in the tandem housing; a series of cap screws relatively loosely received in the set of holes of each flange and threaded into a respective set of the threaded holes, said flange of the final drive housing being provided with a pair of horizontally spaced locating holes provided at opposite sides of the first opening and a pair of locating dowels being tightly received in the locating holes and fixed in said inner wall; said flanges of the first and second axle housings each being provided with at least one locating hole with the holes being located on a line of centers passing through the first and second axles; and a second pair of dowels respectively being tightly received in said at least one locating hole of each of the flanges of the first and second axle housings and fixed in said outer wall, whereby said dowels serve to accurately space the final drive shaft and the first and second axles one from the other; each of said flanges containing a continuous seal groove extending about a respective opening in the tandem housing; and a seal being received in each groove.

* * * * *